US012037217B2

(12) United States Patent
Wada et al.

(10) Patent No.: US 12,037,217 B2
(45) Date of Patent: Jul. 16, 2024

(54) PAPER SHEET STACKING DEVICE AND METHOD FOR CONTROLLING PAPER SHEET STACKING DEVICE

(71) Applicant: FUJITSU FRONTECH LIMITED, Tokyo (JP)

(72) Inventors: Takashi Wada, Tokyo (JP); Yuji Tanaka, Tokyo (JP); Katsuo Takahashi, Tokyo (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 123 days.

(21) Appl. No.: 16/928,552

(22) Filed: Jul. 14, 2020

(65) Prior Publication Data

US 2020/0339368 A1 Oct. 29, 2020

Related U.S. Application Data

(63) Continuation of application No. PCT/JP2018/003041, filed on Jan. 30, 2018.

(51) Int. Cl.
*B65H 7/06* (2006.01)
*B65H 1/26* (2006.01)
*G07D 11/17* (2019.01)

(52) U.S. Cl.
CPC ................. *B65H 7/06* (2013.01); *B65H 1/26* (2013.01); *G07D 11/17* (2019.01); *B65H 2301/421* (2013.01); *G07D 2211/00* (2013.01)

(58) Field of Classification Search
CPC . B65H 7/06; B65H 1/26; B65H 31/06; B65H 31/20; B65H 2301/421
See application file for complete search history.

(56) References Cited

U.S. PATENT DOCUMENTS 6,474,549 B2 * 11/2002 Katou .................... G07D 11/20 235/379
6,978,926 B2 * 12/2005 Kobayashi ............ B65H 31/10 902/12
8,596,444 B2 * 12/2013 Nishida ................ G07F 19/202 194/206

FOREIGN PATENT DOCUMENTS

CN 1258896 A 7/2000
EP 0994445 A2 * 4/2000

(Continued)

OTHER PUBLICATIONS

Form PCT/ISA/237; Written Opinion; dated Apr. 10, 2018 in corresponding PCT Application No. PCT/JP2018/003041 (3 pages).

(Continued)

*Primary Examiner* — Howard J Sanders
(74) *Attorney, Agent, or Firm* — STAAS & HALSEY LLP

(57) ABSTRACT

A paper sheet stacking device includes: a conveyance mechanism that conveys paper sheets; a stacking mechanism including a stacking space in which the paper sheets, which are conveyed by the conveyance mechanism, are stacked, a first space regulating member that moves in a thickness direction of the paper sheets in the stacking space, a support member that extends in the moving direction of the first space regulating member and supports one side of the paper sheets in the stacking space, and a second space regulating member that is provided to face the support member and moves in a direction toward and away from the support member; and a controller that controls the stacking mechanism. The controller controls a position of the second space regulating member in accordance with an outer dimension of the paper sheets that are conveyed into the stacking space by the conveyance mechanism.

5 Claims, 5 Drawing Sheets

(56) References Cited

FOREIGN PATENT DOCUMENTS

| | | | | |
|---|---|---|---|---|
| EP | 0994445 A2 | | 4/2000 | |
| JP | 2000-072311 A | | 3/2000 | |
| JP | 2006-163917 A | | 6/2006 | |
| JP | 2007-226692 A | | 9/2007 | |
| JP | 2007-286752 A | | 11/2007 | |
| JP | 2016-204157 A | | 12/2016 | |
| JP | 2017-167950 A | | 9/2017 | |
| WO | WO-2016203552 A1 | * | 12/2016 | ........... B65H 29/006 |

OTHER PUBLICATIONS

Forms PCT/ISA/210, PCT/ISA/220; International Search Report dated Apr. 10, 2018 in corresponding PCT Application No. PCT/JP2018/003041(3 pages) (1 page English Translation).
First Notification of Office Action issued Jun. 30, 2021 in corresponding Chinese Patent Application No. 201880084633.1 (8 pages) (11 pages English Translation).

* cited by examiner

PAPER SHEET STACKING DEVICE AND METHOD FOR CONTROLLING PAPER SHEET STACKING DEVICE

CROSS-REFERENCE TO RELATED APPLICATION

This application is a continuation application of International Application PCT/JP2018/003041, filed on Jan. 30, 2018 and designating the U.S., the entire contents of which are incorporated herein by reference.

FIELD

The present invention relates to a paper sheet stacking device and a method for controlling a paper sheet stacking device.

BACKGROUND

For example, an automatic teller machine includes a banknote stacking device (dispensing device) on which banknotes to be dispensed are stacked when dispensing banknotes that are paper sheets to a user. This type of banknote stacking device includes a conveyance mechanism that conveys banknotes, and a stacking mechanism that stacks banknotes, which are conveyed by the conveyance mechanism. An example of the stacking mechanism includes a stacking space in which banknotes are stacked, a space regulating member that moves along the thickness direction of the banknotes stacked in the stacking space, a support member that supports the banknotes stacked in the stacking space along one side of the banknotes, and a wall member arranged facing the support member.

Patent Literature 1: Japanese Laid-open Patent Publication No. 2007-286752

In the stacking mechanism of the above-described banknote stacking device, the dimensions between the support member and the wall member are constant, whereas the gap, which is generated between the banknotes one side of which is supported on the support member and the wall member, fluctuates. In other words, among the banknotes stacked in the stacking space, when banknotes having a small outer dimension, in particular, banknotes having a small dimension between the support member and the wall member are stacked, a relatively large gap is inevitably formed between the banknotes supported on the support member and the wall member. For this reason, the banknotes conveyed into the stacking space by the conveyance mechanism are likely to be caught in the above-described gap. When banknotes are caught in the gap, a paper jam (hereinafter, referred to as a jam) may occur in the stacking space.

SUMMARY

According to an aspect of the embodiments, a paper sheets stacking device includes: a conveyance mechanism that conveys paper sheets; a stacking mechanism including a stacking space in which the paper sheets, which are conveyed by the conveyance mechanism, are stacked, a first space regulating member that moves in a thickness direction of the paper sheets in the stacking space, a support member that extends in the moving direction of the first space regulating member and supports one side of the paper sheets in the stacking space, and a second space regulating member that is provided to face the support member and moves in a direction toward and away from the support member; and a controller that controls the stacking mechanism, wherein the controller controls a position of the second space regulating member in accordance with an outer dimension of the paper sheets that are conveyed into the stacking space by the conveyance mechanism.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments of a paper sheet stacking device and a method for controlling a paper sheet stacking device disclosed in the present application, will be described in detail with reference to the accompanying drawings. The following embodiments do not limit the paper sheet stacking device and the method for controlling a paper sheet stacking device disclosed in the present application.

EMBODIMENTS

[Configuration of Banknote Handling Device]

Figure 1:
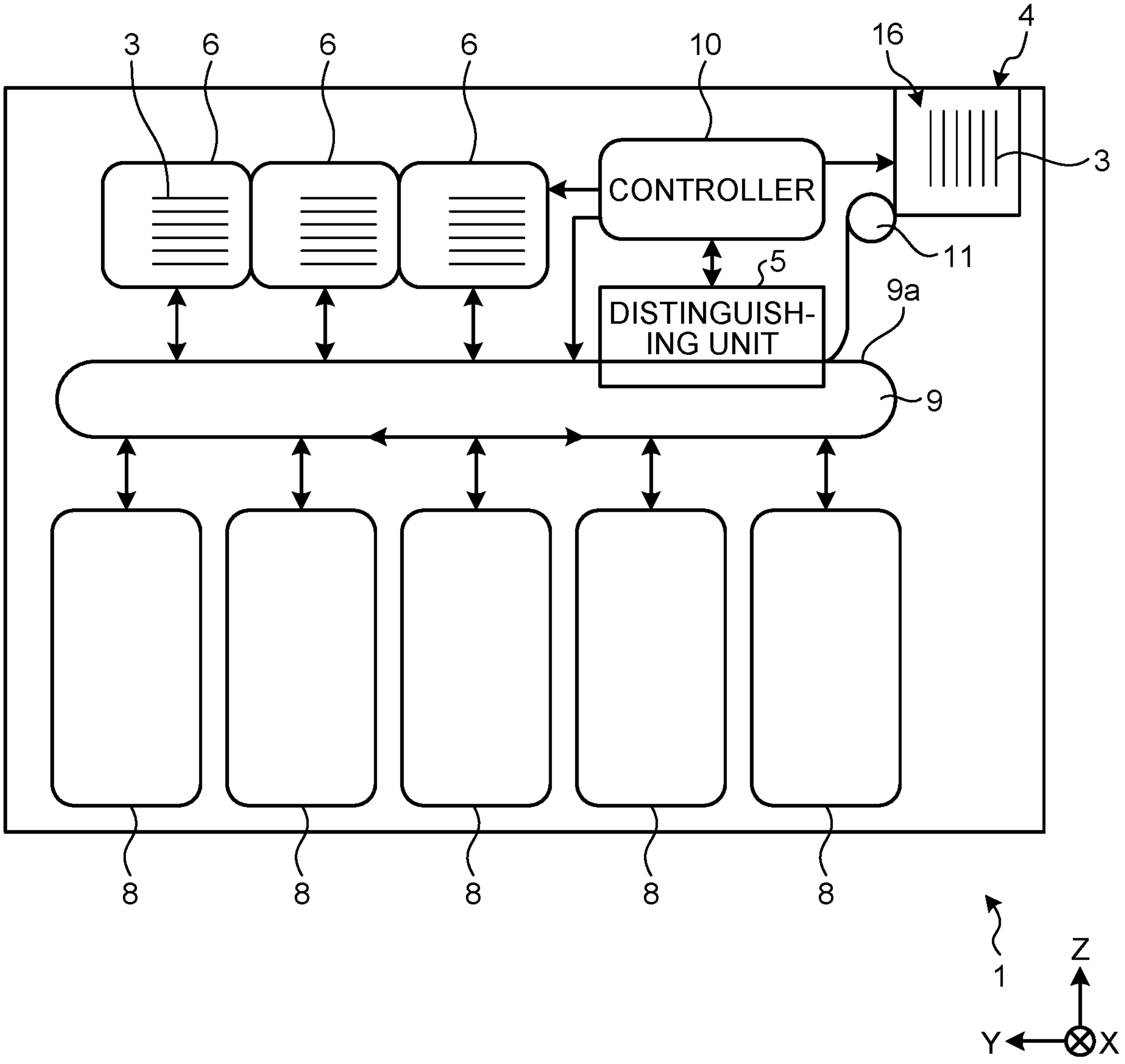
FIG. 1 is a schematic diagram illustrating the entire banknote handling device according to an embodiment.

FIG. 1 is a schematic diagram illustrating the entire banknote handling device according to an embodiment. As illustrated in FIG. 1, a banknote handling device 1 according to the embodiment includes a receiving/dispensing unit 4 that receives and dispenses banknotes 3 that are paper sheets, a distinguishing unit 5 that distinguishes between the banknotes 3, which are received in the receiving/dispensing unit 4, temporary storage units 6 that temporarily store the banknotes 3, which are conveyed from the distinguishing unit 5, and collecting units 8 that store the banknotes 3, which are sent from the temporary storage units 6. The banknote handling device 1 also includes a conveyance mechanism 9 that conveys the banknotes 3 along a conveyance path 9*a* among the units 4, 5, 6, and 8, and a controller 10 that controls the units 4, 5, 6, 8, and 9.

Figure 2:
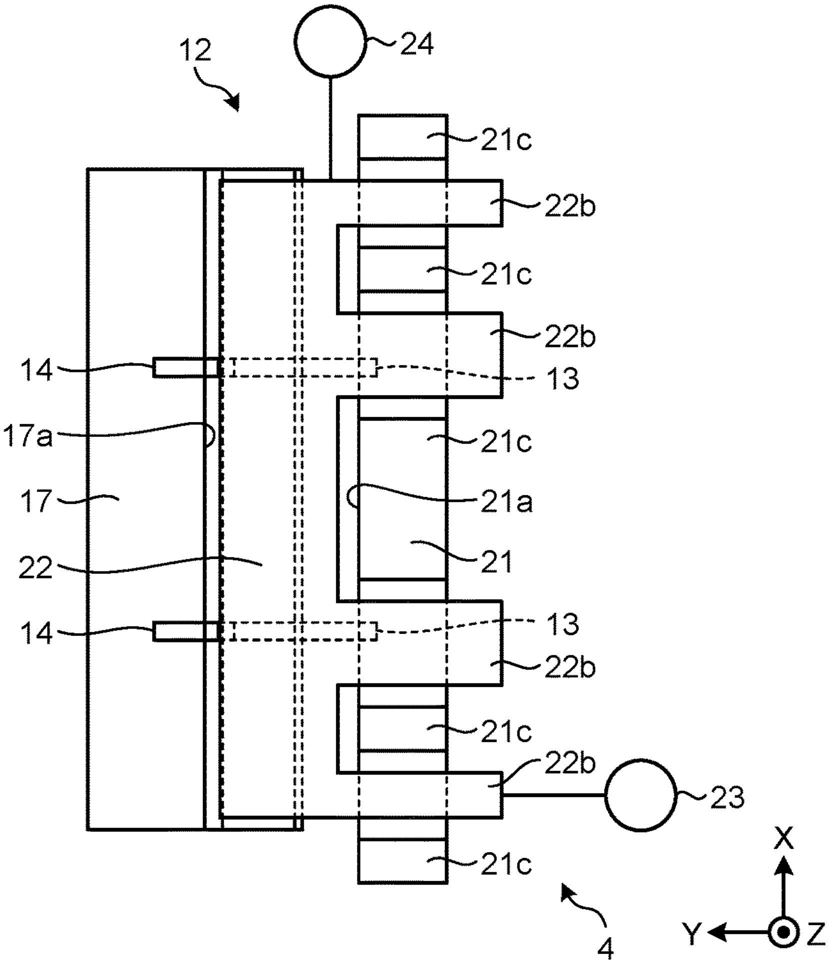
FIG. 2 is a plan view illustrating a banknote stacking device according to the embodiment.

For convenience of description, in FIG. 1, the width direction of the banknote handling device 1 is referred to as an X direction, the front-back direction of the banknote handling device 1 is referred to as a Y direction, and the vertical direction of the banknote handling device 1 is referred to as a Z direction. FIG. 2 and the subsequent drawings also illustrate the X, Y, and Z directions, as in FIG. 1.

As illustrated in FIG. 1, the receiving/dispensing unit 4, which is incorporated in the banknote handling device 1, corresponds to a banknote stacking device according to the embodiment. The banknotes 3, which are sent from a storage unit 7, are stacked in the receiving/dispensing unit 4. In the description below, the receiving/dispensing unit 4 is referred to as the banknote stacking device 4. In the banknote handling device 1 according to the present embodiment, the banknote stacking device 4 may be configured as a dispensing unit independent of a receiving unit in which users puts banknotes 3. In the present embodiment, banknotes 3 are used as an example of paper sheets, but examples thereof are not limited to banknotes 3. Examples of the paper sheets include drafts, checks, gift certificates, various securities, and valuable securities such as stock certificates.

[Configuration of Banknote Stacking Device]

Figure 3:
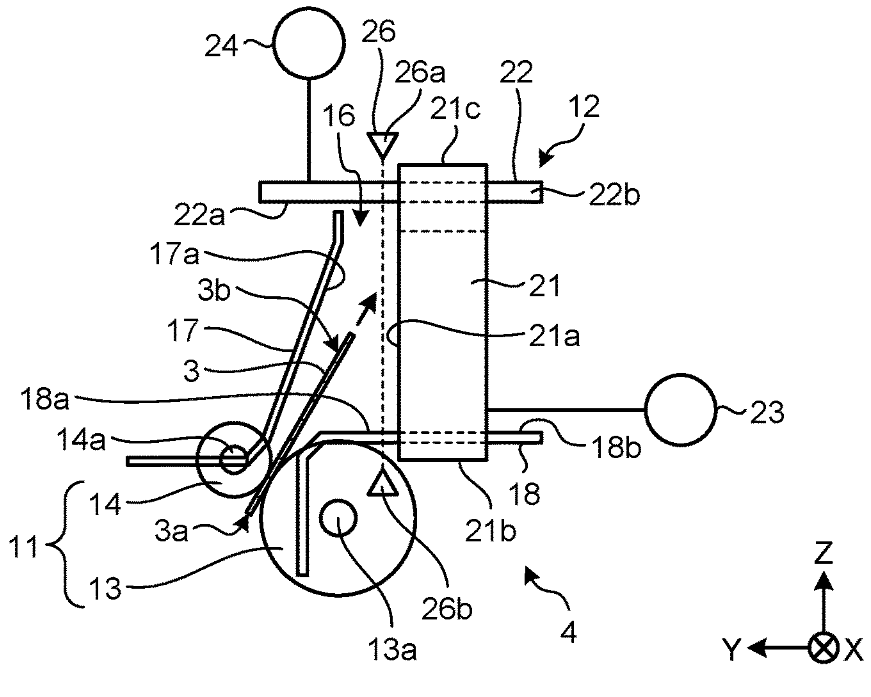
FIG. 3 is a side view illustrating the banknote stacking device according to the embodiment.
Figure 4:
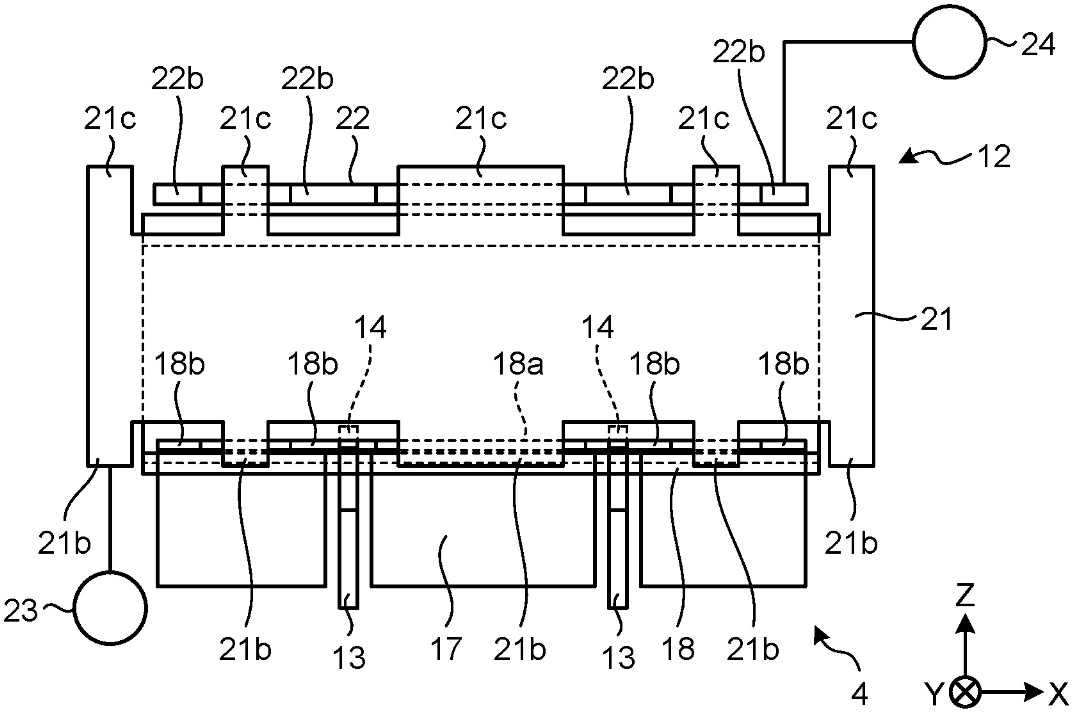
FIG. 4 is a front view illustrating the banknote stacking device according to the embodiment.

FIG. 2 is a plan view illustrating the banknote stacking device 4 according to the embodiment. FIG. 3 is a side view illustrating the banknote stacking device 4 according to the embodiment. FIG. 4 is a front view illustrating the banknote stacking device 4 according to the embodiment. As illustrated in FIGS. 2, 3, and 4, the banknote stacking device 4 includes a conveyance mechanism 11 that conveys the banknotes 3, and a stacking mechanism 12 that stacks the banknotes 3, which are conveyed by the conveyance mechanism 11. Although the stacking mechanism 12 in the present embodiment is controlled by the above-described controller 10, the banknote stacking device 4 may include another controller independent of the controller 10 to control the stacking mechanism 12.

The conveyance mechanism 11 includes conveyance rollers 13, driven rollers 14 that rotate following the respective conveyance rollers 13, and a conveyance motor (not illustrated) that drives the conveyance rollers 13 to rotate. As illustrated in FIG. 3, the conveyance roller 13 is supported on a rotational shaft 13*a*. As illustrated in FIGS. 2 and 4, two conveyance rollers 13 are spaced apart in the axial direction (X direction) of the rotational shaft 13*a*. The driven rollers 14 are provided in contact with the respective conveyance rollers 13. As illustrated in FIG. 3, the driven roller 14 is supported on a rotational shaft 14*a*. As illustrated in FIGS. 2 and 4, two driven rollers 14 are spaced apart in the axial direction of the rotational shaft 14*a*.

The conveyance mechanism 11 has the conveyance motor electrically connected to the controller 10, and is driven and controlled by the controller 10. The conveyance mechanism 11 conveys the banknotes 3 in a direction inclined with respect to the vertical direction (Z direction) within a stacking space 16, so that the banknotes 3 are piled and stacked on an inner surface 21*a* of a first space regulating member 21 described later. In addition, the conveyance mechanism 11 conveys the rectangular banknotes 3 along their short-side 3*b* direction. As compared with a case of conveying the banknotes 3 along their long-side 3*a* direction, flapping of the banknotes 3, while being conveyed into the stacking space 16, can be suppressed.

The stacking mechanism 12 includes the stacking space 16 in which the banknotes 3, which are conveyed by the conveyance mechanism 11, are stacked, a guide member 17 that guides the banknotes 3, which are conveyed by the conveyance mechanism 11, into the stacking space 16, and a support member 18 that supports one side of the banknotes 3 in the stacking space 16. Furthermore, the stacking mechanism 12 includes the first space regulating member 21 that moves in the thickness direction (Y direction) of the banknotes 3 in the stacking space 16, and a second space regulating member 22 that moves in a direction toward and away from the support member 18 (Z direction).

The stacking space 16 is a space, which is surrounded by the guide member 17, the support member 18, the first space regulating member 21, and the second space regulating member 22. The guide member 17 includes a guide surface 17*a* that extends in a direction inclined with respect to the conveyance direction of the banknotes 3 conveyed into the stacking space 16 by the conveyance mechanism 11, and guides the banknotes 3, which are conveyed by the conveyance rollers 13 and the driven rollers 14, to the stacking space 16. In other words, the guide surface 17*a* is inclined with respect to the inner surface 21*a* of the first space regulating member 21 described later. In the conveyance mechanism 11, the conveyance rollers 13 are disposed on the support member 18 side, and the driven rollers 14 are disposed on the guide member 17 side.

The support member 18 extends in the direction in which the first space regulating member 21 moves, and is disposed below the stacking space 16. The support member 18 has a support surface 18*a* that supports the rectangular banknotes 3 along their long side 3*a*. The support member 18 includes a comb-shaped engaging portion 18*b* to be engaged with the first space regulating member 21. When the first space regulating member 21 moves toward the guide member 17, the first space regulating member 21 engages with the engaging portion 18*b* of the support member 18, so that the movement of the first space regulating member 21 is regulated. In this manner, even when the inside of the stacking space 16 is reduced due to the movement of the first space regulating member 21, the stacking space 16 has a secured predetermined size.

As illustrated in FIG. 4, the first space regulating member 21 includes the inner surface 21*a* that is formed in a flat plate shape and on which the banknotes 3 are piled, a comb-shaped first engaging portion 21*b* that engages with the engaging portion 18*b* of the support member 18, and a comb-shaped second engaging portion 21*c* that engages with the second space regulating member 22. The first space regulating member 21 is provided so as to be movable in the direction (Y direction) toward and away from the guide member 17, that is, in the direction in which the banknotes 3 are stacked.

As illustrated in FIGS. 2 and 4, the second space regulating member 22 is provided to extend in a direction (Y direction) intersecting with the conveyance direction in which the conveyance mechanism 11 conveys the banknotes 3 into the stacking space 16. The second space regulating member 22 is formed in a flat plate shape. The second space regulating member 22 includes an inner surface 22*a* that faces the upper long side 3*a* of the banknotes 3, and a comb-shaped engaging portion 22*b* that engages with the second engaging portion 21*c* of the first space regulating member 21. The second space regulating member 22 is translated in the vertical direction (Z direction) along the short-side 3*b* direction of the banknotes 3 in the stacking space 16. The inner surface 22*a* of the second space regulating member 22 is provided to face the support surface 18*a* of the support member 18, and is disposed above the stacking space 16. When the difference between the lengths of the short side 3*b* of multiple types of banknotes 3 handled by the banknote handling device 1 (the difference between the minimum and the maximum) is, for example, about 20

[mm], the second space regulating member 22 is set to be movable within a range of about 20 [mm] in the vertical direction.

The second space regulating member 22 is translated in the vertical direction (Z direction), so that for each of the banknotes 3 having different short-side 3*b* lengths, the gap between the upper long side 3*a* of the banknotes 3 and the inner surface 22*a* of the second space regulating member 22, can be regulated uniformly and accurately over the stacking direction (Y direction) of the banknotes 3. Here, the second space regulating member 22 will be described by comparing a translatable configuration as in the embodiment with a rotatable configuration, in which one end is rotatably supported on a rotation shaft, for example.

In the rotatable configuration, there is a difference in height from the support surface 18*a* of the support member 18 between the distal end side and the proximal end side of the second space regulating member that rotates around the rotation shaft. As a result, a uniform gap between the inner surface of the second space regulating member and the upper long side 3*a* of the banknotes 3, cannot be secured in the stacking direction of the banknotes 3, and it is difficult to appropriately regulate the banknotes 3 in the short-side 3*b* direction. In the rotatable configuration, it is necessary to rotate the tip of the second space regulating member that rotates around the rotation shaft so as not to collide with the banknotes 3, which are already stacked in the stacking space 16. The range of movement of the second space regulating member is restricted by the position of the rotation shaft. For example, to move the rotatable configuration within a range of about 20 [mm] in the vertical direction (Z direction), it is necessary to dispose the rotation shaft at a position far away from the stacking space 16, and thus the structure of the stacking mechanism 12 is restricted. By contrast, the configuration, in which the second space regulating member 22 is translatable as in the embodiment, can secure a large range within which the inner surface 22*a* of the second space regulating member 22 moves in the vertical direction without any restriction as with the rotatable configuration described above. That is, the second space regulating member 22, which are translatable, can secure a large range of the short-side 3*b* length of the banknotes 3, which can be handled.

In addition, the stacking mechanism 12 includes a first motor 23 for moving the first space regulating member 21 in the vertical direction (Z direction), and a second motor 24 for moving the second space regulating member 22 in the stacking direction of the banknotes 3 (Y direction). The first motor 23 and the second motor 24 are electrically connected to the controller 10, and are driven and controlled by the controller 10. In the present embodiment, the first motor 23 and the second motor 24 are provided independently, but the first space regulating member 21 and the second space regulating member 22 may be driven by a common motor.

In addition, a position sensor 26, which detects the position of the banknotes 3, is provided in the stacking space 16. In other words, the position sensor 26 detects the stacked amount of banknotes 3, which are stacked in the stacking space 16. The position sensor 26 employs an optical sensor, and includes a light-emitting unit 26*a* that emits detection light, and a light-receiving unit 26*b* that receives the detection light emitted by the light-emitting unit 26*a*. In the position sensor 26, for example, the light-emitting unit 26*a* is disposed above the second space regulating member 22, and the light-receiving unit 26*b* is disposed below the support member 18. The position sensor 26 is electrically connected to the controller 10. The controller 10 controls the position of the first space regulating member 21 by moving the first space regulating member 21 based on the detection result of the position sensor 26.

The controller 10 controls the position of the first space regulating member 21 based on the detection result of the position sensor 26. Furthermore, the controller 10 includes a storage element in which data on the outer dimensions of each type of banknotes 3 handled by the banknote handling device 1, is stored. The controller 10 controls the position of the second space regulating member 22 based on the types of the banknotes 3 distinguished by the above-described distinguishing unit 5 and the outer dimension data stored in the storage element in advance. In other words, the controller 10 controls the position of the second space regulating member 22 in accordance with an outer dimension of the banknotes 3 that are conveyed into the stacking space 16 by the conveyance mechanism 11. In the present embodiment, the controller 10 controls both the first space regulating member 21 and the second space regulating member 22. Alternatively, two controllers may be provided that respectively control the first space regulating member 21 and the second space regulating member 22.

[Operation of First Space Regulating Member and Second Space Regulating Member]

Figure 5:
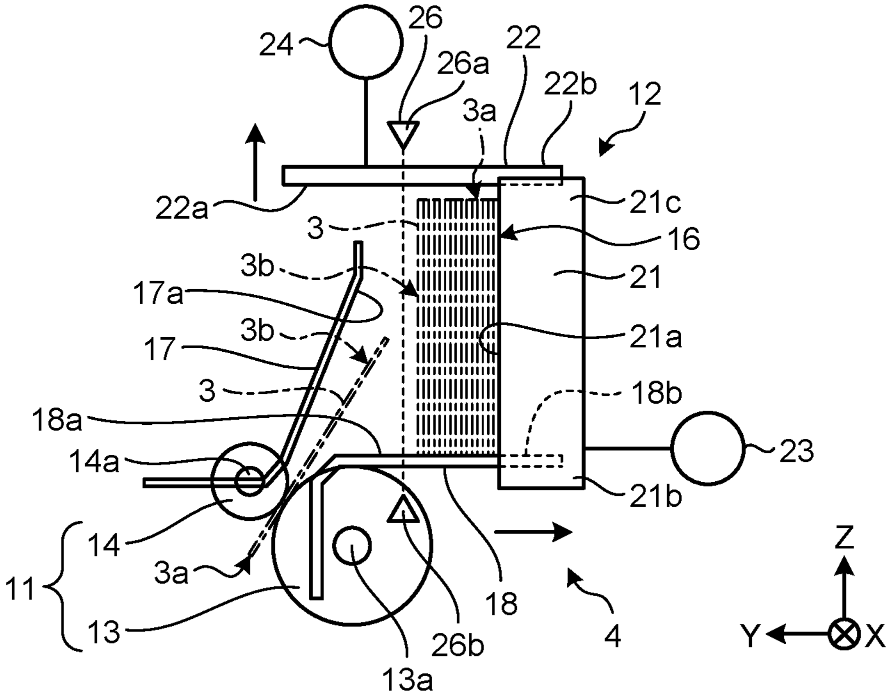
FIG. 5 is a cross-sectional view for explaining an operation of the banknote stacking device according to the embodiment.

FIG. 5 is a cross-sectional view for explaining an operation of the banknote stacking device 4 according to the embodiment. As illustrated in FIG. 5, when the banknotes 3 are conveyed into the stacking space 16 by the conveyance mechanism 11, the first space regulating member 21 is stopped at a predetermined position in the stacking space 16. As the banknotes 3, which are sent into the stacking space 16, are sequentially piled on the inner surface 21*a* of the first space regulating member 21, and the banknotes 3 are thus stacked, the thickness of the banknotes 3 stacked in the stacking space 16, increases from the first space regulating member 21 side toward the guide member 17. The banknotes 3, which are stacked in the stacking space 16, block the detection light from the position sensor 26, whereby the position sensor 26 detects the banknotes 3. When the position sensor 26 detects the banknotes 3, the controller 10 moves the first space regulating member 21 by a predetermined amount as needed in a direction away from the guide member 17, that is, so as to increase the stacking space 16.

The controller 10 causes the second space regulating member 22 to move to a predetermined position in the short-side 3*b* direction (Z direction) of the banknotes 3, in accordance with the type of the banknotes 3 conveyed into the stacking space 16 by the conveyance mechanism 11, that is, the short-side 3*b* length of the banknotes 3. When the second space regulating member 22 is moved to a predetermined position corresponding to each type of banknotes 3, the separation distance between the support surface 18*a* of the support member 18 and the inner surface 22*a* of the second space regulating member 22, is appropriately adjusted. In this process, a predetermined gap is secured between the upper long side 3*a* of the banknotes 3 and the inner surface 22*a* of the second space regulating member 22 in the short-side 3*b* direction of the banknotes 3, whereby the banknotes 3, which are conveyed into the stacking space 16 by the conveyance mechanism 11, are appropriately stacked in the stacking space 16. The predetermined gap is set to, for example, several [mm].

[Operation of Stacking Multiple Types of Banknotes in Stacking Space]

Figure 6:
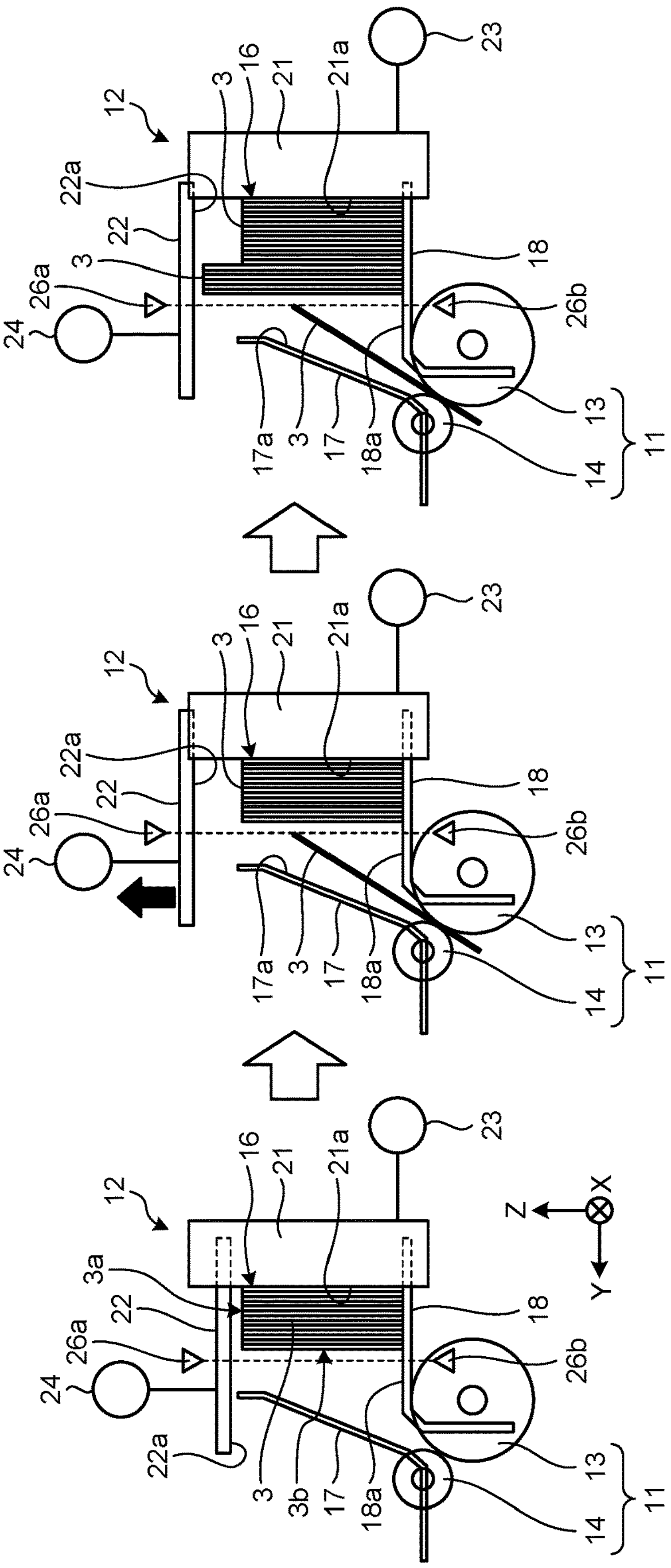
FIG. 6 is a cross-sectional view for explaining an operation of the banknote stacking device according to the embodiment for stacking multiple types of banknotes.

FIG. 6 is a cross-sectional view for explaining an operation of the banknote stacking device 4 according to the embodiment for stacking multiple types of banknotes 3. The controller 10 controls the banknote handling device 1 and the banknote stacking device 4 such that when the banknotes 3 are conveyed into the stacking space 16 by the conveyance mechanism 11, the banknotes 3 are grouped by types and stacked in the stacking space 16.

As illustrated in FIG. 6, in stacking multiple types of banknotes 3 in the stacking space 16, the controller 10 performs control such that the banknotes 3 are conveyed into the stacking space 16 in the order of their lengths, starting from the banknotes 3 having the smallest length along the other side (short side 3*b*) that intersects one side (long side 3*a*), which is supported by the support member. After the banknotes 3 with a relatively small short-side 3*b* length among multiple types of banknotes 3, are stacked in the stacking space 16, the controller 10 controls the position of the second space regulating member 22 by raising the second space regulating member 22 in accordance with the short-side 3*b* length of the banknotes 3 to be stacked next. In this manner, the distance between the support member 18 and the second space regulating member 22 becomes an appropriate distance in accordance with the short-side 3*b* length of the banknotes 3 to be conveyed into the stacking space 16 next.

Thereafter, the controller 10 controls the position of the second space regulating member 22 as necessary for each type of the banknotes 3 to be stacked in the stacking space 16, thereby stacking multiple types of banknotes 3 in the stacking space 16. The controller 10 controls the second space regulating member 22 in this manner, whereby the banknotes 3 are prevented from being caught in the gap between the upper long side 3*a* of the banknotes 3 and the inner surface 22*a* of the second space regulating member 22, and multiple types of banknotes 3 can be stacked in the stacking space 16 while being aligned stepwise in the short-side 3*b* direction.

After stacking desired banknotes 3 in the stacking space 16 as described above, the banknote stacking device 4 holds the banknotes 3, which are piled and stacked on the inner surface 21*a* of the first space regulating member 21, between a holding member (not illustrated) and the first space regulating member 21, and conveys the banknotes 3 to a predetermined dispensing position. Subsequently, the banknote stacking device 4 opens a shutter member (not illustrated) provided to be openable and closable to cover the dispensing position, and the stacked banknotes 3 are taken out from the banknote stacking device 4 by the user. Lastly, after the banknotes 3, which are stacked in the stacking space 16, are removed from the stacking space 16, the controller 10 controls the second space regulating member 22 to return to a predetermined position, for example, a position corresponding to banknotes 3 with a small short-side 3*b* length. Thus, the banknote stacking device 4 can quickly shift to the next stacking operation of banknotes 3.

[Method for Controlling Banknote Stacking Device]

Figure 7:
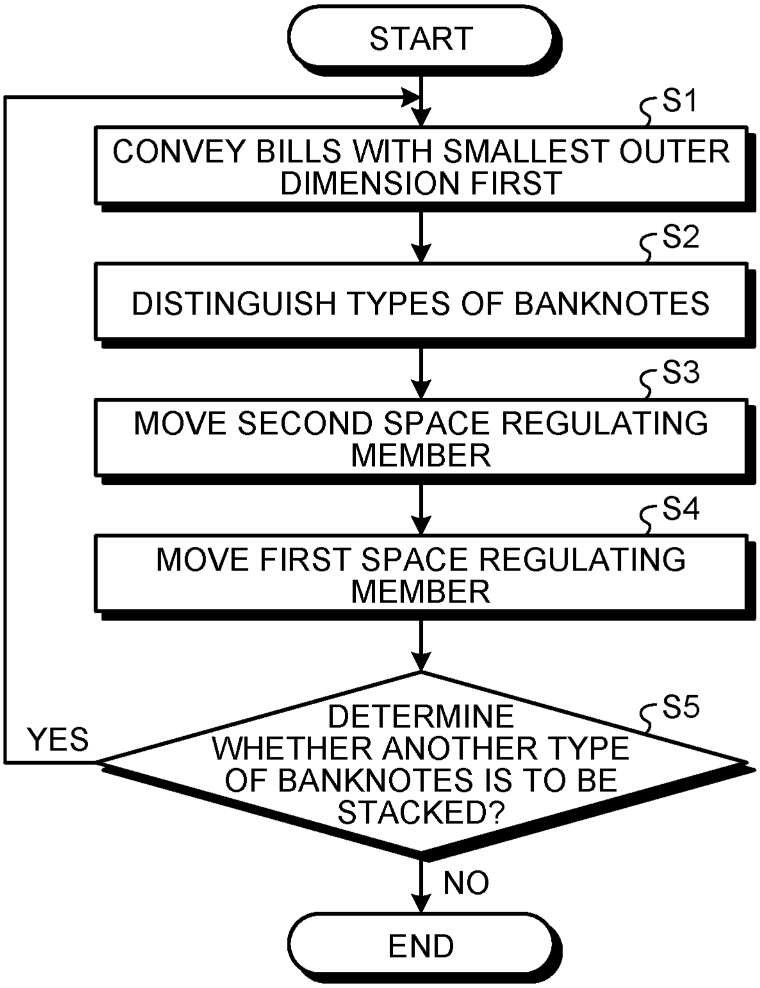
FIG. 7 is a flowchart for explaining an operation of the banknote stacking device according to the embodiment for stacking multiple types of banknotes.

A method for controlling the banknote stacking device 4 according to the embodiment configured as described above, will be described. FIG. 7 is a flowchart for explaining an operation of the banknote stacking device 4 according to the embodiment for stacking multiple types of banknotes 3. First, as illustrated in FIG. 7, when multiple types of banknotes 3 are stacked in the stacking space 16, the banknote handling device 1 is controlled such that the banknotes 3 with the smallest outer dimension are conveyed into the stacking space 16 first (step S1). The controller 10 distinguishes the types of the banknotes 3 with the distinguishing unit 5 before conveying the banknotes 3 to the stacking space 16 (step S2), and reads out data on the outer dimensions corresponding to the type of the banknotes 3, which is distinguished by the distinguishing unit 5, from a storage element. In this way, the controller 10 recognizes an outer dimension of the banknotes 3, thereby moving the second space regulating member 22 in accordance with the outer dimension of the banknotes 3 that are conveyed into the stacking space 16 by the conveyance mechanism 11 (step S3) and controlling the position of the second space regulating member 22.

Subsequently, the controller 10 moves the first space regulating member 21 by a predetermined amount each time the position sensor 26 detects banknotes 3 as the stacked amount of banknotes 3, which are stacked in the stacking space 16, increases (step S4). Next, the controller 10 determines whether another type of banknotes 3 that is different from the type of the banknotes 3, which are stacked in the stacking space 16, is to be conveyed into the stacking space 16 (step S5). If the controller 10 determines in step S5 that another type of banknotes 3 is to be stacked (Yes), the processing by the banknote stacking device 4 returns to step S1 described above, where the banknote stacking device 4 continues the stacking operation of the other type of banknotes 3 in the same manner as described above. On the other hand, if the controller 10 determines in step S5 that another type of banknotes 3 is not to be stacked (No), the banknote stacking device 4 ends the stacking operation of banknotes 3.

The banknote stacking device 4 according to the embodiment described above includes the stacking mechanism 12 including the first space regulating member 21 that moves in the thickness direction of the banknotes 3 in the stacking space 16, the support member 18 that supports one side (the lower long side 3*a*) of the banknotes 3 in the stacking space 16, and the second space regulating member 22 that moves in a direction toward and away from the support member 18. The controller 10 controls the position of the second space regulating member 22 in accordance with an outer dimension (short-side 3*b* length) of the banknotes 3 that are conveyed into the stacking space 16 by the conveyance mechanism 11. In this way, the position of the second space regulating member 22 is controlled in accordance with the outer dimension of the banknotes 3 that are conveyed into the stacking space 16, which prevents a large gap from being formed above the upper long side 3*a* of the banknotes 3 one side (lower long side 3*a*) of which is supported by the support member 18 in the stacking space 16. This can prevent the banknotes 3, which are conveyed into the stacking space 16, from being caught in the above-described gap and prevent the occurrence of a jam of the banknotes 3 in the stacking space 16, whereby the reliability of the stacking operation of the banknotes 3 can be increased.

In the banknote stacking device 4 according to the embodiment, the support member 18 supports the long side 3*a* of the rectangular banknotes 3, and the second space regulating member 22 moves along the short-side 3*b* direction of the banknotes 3 in the stacking space 16. With the long side 3*a* of the banknotes 3 supported on the support member 18 in this manner, the posture of the banknotes 3 supported by the support member 18, is stabilized compared with a case where the short side 3*b* is supported on the support member 18. Accordingly, the stacking state of the banknotes 3 in the stacking space 16 is stabilized, and the reliability of the stacking operation of the banknotes 3 can be further increased.

Furthermore, in the embodiment, in stacking multiple types of banknotes 3 in the stacking space 16, the controller 10 performs control such that the banknotes 3 are conveyed into the stacking space 16 in the order of their lengths, starting from the banknotes 3 having the smallest short-side 3*b* length. Thus, with a simple configuration using a single second space regulating member 22, multiple types of banknotes 3 can be appropriately stacked in the stacking space 16 with the second space regulating member 22.

Furthermore, the second space regulating member 22 in the banknote stacking device 4 according to the embodiment, is provided to extend in a direction intersecting with the conveyance direction, in which the conveyance mechanism 11 conveys the banknotes 3 into the stacking space 16. Particularly in the case of such a conveyance direction of the banknotes 3, the banknotes 3, which are conveyed into the stacking space 16, come into contact with the inner surface 22*a* of the second space regulating member 22, and the banknotes 3 are likely to be caught in the gap between the stacked banknotes 3 and the inner surface 22*a* of the second space regulating member 22. By keeping the above-described gap small with the second space regulating member 22, the occurrence of a jam of the banknotes 3 in the stacking space 16, can be effectively prevented.

In the embodiment, the controller 10 controls the second space regulating member 22 to move to a predetermined position after the banknotes 3, which are stacked in the stacking space 16, are removed. Thus, after the stacked banknotes 3 are removed, it is possible to quickly shift to the next stacking operation of banknotes 3.

Note that the layout of the banknote stacking device 4 according to the embodiment does not limit the posture of the banknote handling device 1 in the X, Y, and Z directions. While the banknote stacking device 4 is laid such that the inner surface 21*a* of the first space regulating member 21, on which the banknotes 3 are piled and stacked, has a posture along the vertical direction (Z direction), the banknote stacking device 4 may be alternatively laid such that the inner surface 21*a* of the first space regulating member 21 has a posture along the horizontal direction (X-Y plane).

While the banknotes 3 are stacked in the stacking space 16 in such an orientation that the long side 3*a* of the banknotes 3 is supported on the support member 18 in the banknote stacking device 4 according to the embodiment, the orientations of the long side 3*a* and the short side 3*b* of the banknotes 3, which are stacked in the stacking space 16, are not limited. As necessary, the banknotes 3 may be stacked in a stacking space 16 in such an orientation that the short side 3*b* of the banknotes 3 is supported on the support member 18.

Furthermore, while the banknote stacking device 4 according to the embodiment includes a single second space regulating member 22, it may include a plurality of second space regulating members 22 as necessary. This configuration may include, for example, a second space regulating member for small banknotes that is moved in staking multiple types of banknotes 3 having relatively small outer dimensions, among multiple types of banknotes 3, and include a second space regulating member for large banknotes that is moved in stacking multiple types of banknotes 3 having relatively large outer dimensions, whereby the range of the outer dimensions of the banknotes 3 that can be appropriately stacked in the stacking space 16, can be expanded.

According to one aspect of a paper sheet stacking device disclosed in the present application, the reliability of a stacking operation of paper sheets can be increased.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A paper sheet stacking device comprising:

a conveyance mechanism that conveys paper sheets;

a stacking mechanism including, a stacking space in which the paper sheets, which are conveyed by the conveyance mechanism, are stacked, a first space regulating member that moves in a thickness direction of the paper sheets in the stacking space, a support member that extends in a moving direction of the first space regulating member and includes a support surface that supports one side of the paper sheets in the stacking space, and a second space regulating member that is provided to face the support member and configured to be translatable in a direction orthogonal to the support surface of the support member, wherein the first space regulating member is provided, with a first comb-shaped engaging portion that is engageable with the second space regulating member and that extends in the moving direction of the second space regulating member, and with a second comb-shaped engaging portion that is engageable with an engaging portion of the support member; and the second space regulating member is formed in a flat plate shape along the support surface of the support member, and includes a comb-shaped engaging portion, which is engageable with the first comb-shaped engaging portion of the first space regulating member, that is provided on an end of the second space regulating member and that extends parallel to the support surface of the support member along the moving direction of the first space regulating member; and a controller that controls the stacking mechanism, wherein the controller, controls a translating of the second space regulating member with the comb-shaped engaging portion in the direction orthogonal to the support surface of the support member while the second space regulating member is engaged with the first comb-shaped engaging portion of the first space regulating member and the second comb-shaped engaging portion of the first space regulating member is engaged with the engaging portion of the support member, resulting in positioning of the second space regulating member in accordance with an outer dimension of the paper sheets that are conveyed into the stacking space by the conveyance mechanism while the second comb-shaped engaging portion of the first space regulating member is engaged with the engaging portion of the support member, and controls a conveying of the paper sheets into the stacking space as a same stacking space in an order of lengths thereof, starting from the paper sheets having a smallest length along another side intersecting the one side, so that multiple types of paper sheets are stackable in the same stacking space.

2. The paper sheet stacking device according to claim 1, wherein the support member supports a long side of rectangular paper sheets, and the second space regulating member moves along a short-side direction of the paper sheets in the stacking space.

3. The paper sheet stacking device according to claim 1, wherein the second space regulating member is provided to extend in a direction intersecting with a conveyance direction in which the conveyance mechanism conveys the paper sheets into the stacking space.

4. The paper sheet stacking device according to claim 1, wherein the controller controls the second space regulating member to move to a predetermined position after the paper sheets, which are stacked in the stacking space, are removed.

5. A method for controlling a paper sheet stacking device that includes, a conveyance mechanism that conveys paper sheets;

a stacking mechanism including a stacking space in which the paper sheets, which are conveyed by the conveyance mechanism, are stacked, a first space regulating member that moves relative to a thickness direction of the paper sheets stacked in the stacking space, a support member that extends in a moving direction of the first space regulating member and includes a support surface that supports one side of the paper sheets stacked in the stacking space, and a second space regulating member that is provided to face the support member and configured to be translatable in a direction orthogonal to the support surface of the support member, wherein, the first space regulating member is provided, with a first comb-shaped engaging portion that is engageable with the second space regulating member and that extends in the moving direction of the second space regulating member, and with a second comb-shaped engaging portion that is engageable with an engaging portion of the support member; and the second space regulating member is formed in a flat plate shape along the support surface of the support member, and includes a comb-shaped engaging portion, which is engageable with the first comb-shaped engaging portion of the first space regulating member, that is provided on an end of the second space regulating member and that extends parallel to the support surface of the support member along the moving direction of the first space regulating member; and a controller to control the stacking mechanism, the method comprising;

controlling, by the controller, a translating of the second space regulating member with the comb-shaped engaging portion in the direction orthogonal to the support surface of the support member while the second space regulating member is engaged with the first comb-shaped engaging portion of the first space regulating member and the second comb-shaped engaging portion of the first space regulating member is engaged with the engaging portion of the support member, resulting in positioning of the second space regulating member in accordance with an outer dimension of the paper sheets that are conveyed into the stacking space by the conveyance mechanism while the second comb-shaped engaging portion of the first space regulating member is engaged with the engaging portion of the support member, and a conveying of the paper sheets into the stacking space as a same stacking space in an order of lengths thereof, starting from the paper sheets having a smallest length along another side intersecting the one side, so that multiple types of paper sheets are stackable in the same stacking space.

* * * * *